United States Patent [19]

Dimitroff

[11] 4,068,474

[45] Jan. 17, 1978

[54] APPARATUS AND PROCESS FOR STEAM GENERATION BY SOLAR ENERGY

[76] Inventor: Boris Dimitroff, 4014 Perlita Ave. No. 6, Los Angeles, Calif. 90039

[21] Appl. No.: 718,402

[22] Filed: Aug. 30, 1976

[51] Int. Cl.² .............................................. F03G 7/02
[52] U.S. Cl. ..................................... 60/641; 126/271
[58] Field of Search .................... 60/641; 126/270, 271

[56] References Cited

U.S. PATENT DOCUMENTS

| Re. 25,242 | 9/1962 | Toulmin, Jr. | 126/270 |
| 3,985,118 | 10/1976 | Bard | 126/271 |
| 3,993,041 | 11/1976 | Diggs | 126/271 |
| 4,000,733 | 1/1977 | Pauly | 126/270 |

Primary Examiner—Allen M. Ostrager
Attorney, Agent, or Firm—Jerome A. Gross

[57] ABSTRACT

Steam to be supplied to a turbine is generated in a single pressure chamber reservoir by solar energy concentrated on the head of a conductor mounted in the top wall of the reservoir chamber with its conductive portion extending downward through a head space into the water. Convector surfaces on the conductor in the head space super heats the steam as it flows to the turbine. The solar energy is supplied from a parabolic reflector and directed through a lens system to a focus on the head of the conductor. The focus may be modulated to assure optimum operation without overheating.

6 Claims, 5 Drawing Figures

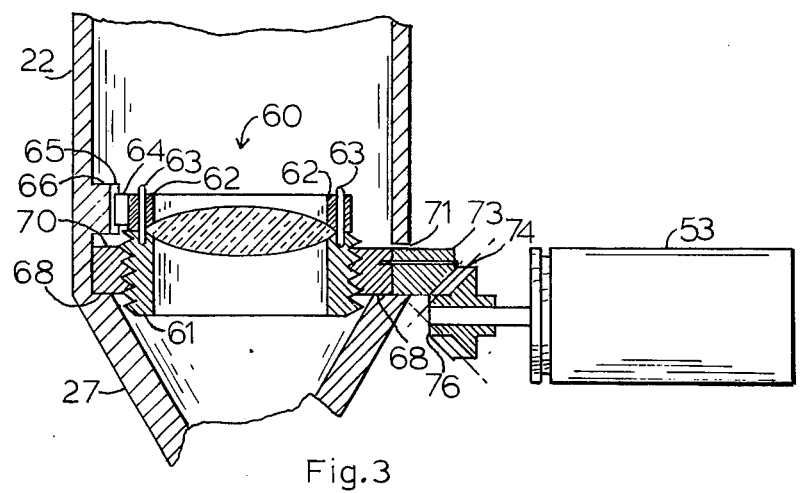
Fig. 3
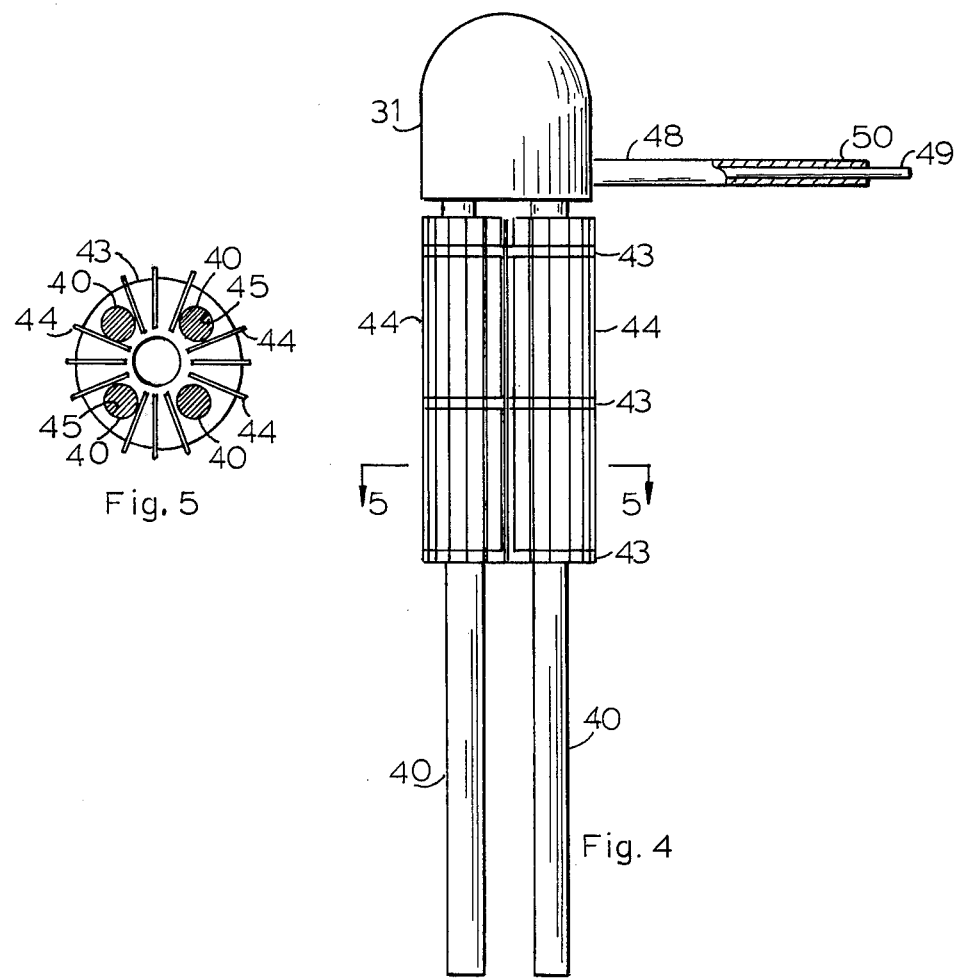
Fig. 5
Fig. 4

APPARATUS AND PROCESS FOR STEAM GENERATION BY SOLAR ENERGY

BACKGROUND OF THE INVENTION

Solar energy is conventionally used in water heating systems, ordinarily by use of relatively large substantially flat solar collector panels. Operating temperatures within such panels are necessarily low, in the range of 180° to 230° F. Such systems are not adaptable to steam generating systems because the heat source is not concentrated.

Parabolic reflectors have been used to concentrate solar energy for purposes such as cooking. To the best of applicant's knowledge, such reflectors have not been used effectively to generate steam for driving a turbine.

In conventional steam generating plants a boiler chamber generates steam which is transferred by an outlet to a separate chamber or series of coils to which further heat is applied so to produce superheated steam. The requirement for two separate chambers arises from the practical limitation of applying heat at the bottom of the boiler. The escaping steam has a lower temperature than the heat source and thus superheating must be accomplished by a secondary heating step.

SUMMARY OF THE INVENTION

A principal purpose of the present invention is to concentrate solar energy and utilize it in a process for heating water and superheating its steam in a single chamber. Another purpose is so to control the steam production as to maintain it at an optimum level. Still further purposes will be apparent from the following disclosure.

Briefly summarizing as to superheating the steam, a significant and novel feature of this invention is to apply heat derived from solar radiation at the top of a steam chamber such that the steam generated in the lower portion passes over much hotter heat surfaces in the upper part of the same chamber, thereby superheating it for use directly in a steam turbine. The process of the invention is substantially as follows: solar energy is concentrated in a conventional reflector and directed through a lens system to focus on the heat-receiving head of a conductor element. The heat so generated is conducted downward into a water reservoir chamber through a conductive means extending below the water line. The water in the reservoir acts as a heat sink and absorbs part of the conducted heat, producing steam. When the steam flows along convector surfaces positioned above the water level on the upper segment of the conductor means it is further heated, and becoming superheated, passing under pressure through the steam outlet and into the turbine. Thus, the process of making superheated steam is achieved in a single heating chamber.

The invention also consists of means to control the temperature and pressure parameters of the steam system. In the embodiments illustrated, a thermosensor signals a control means to change the focus of the solar radiation impinging on the heat-receiving head of the conductor element. Alternately, a pressure sensor might be employed with other means to regulate the quantum of energy so received by the head of the conductor element.

BRIEF DESCRIPTION OF THE DRAWINGS

FIG. 3 is a fragmentary sectional view, somewhat enlarged, of the light focusing system of FIG. 2.

FIG. 4 is an enlarged view of the heat conductor element of FIG. 2 showing its rod-and-tube type thermosensor.

FIG. 5 is a sectional view taken along line 5 — 5 of FIG. 4.

DESCRIPTION OF THE PREFERRED EMBODIMENT

Figure 1:
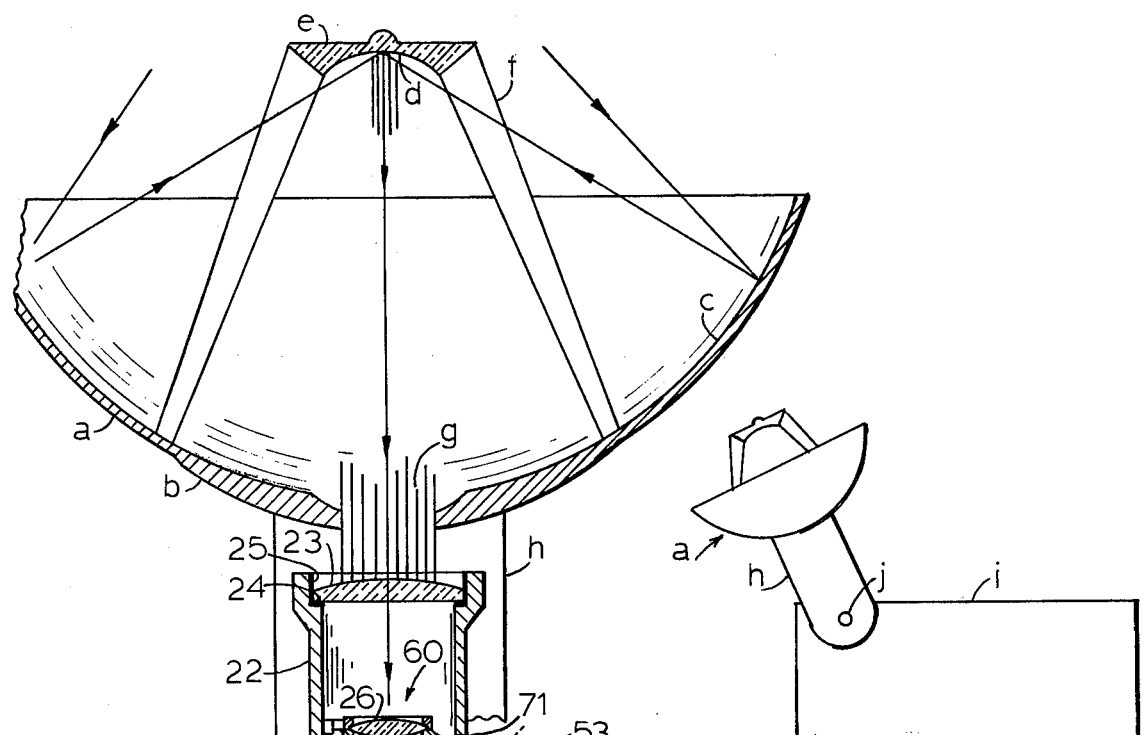
FIG. 1 is a schematic view of a steam generating system having sun following reflector means to gather solar energy.

The general organization of a preferred embodiment of the present invention is shown in FIG. 1. Light-concentrating means generally designated $a$ are mounted onto a steam generator housing generally designated $i$ by light-following mount means, schematically illustrated as comprising a pair of support arms $h$ and a pivot mount means $j$. These will be now referred to in greater detail.

As illustrated, the light-concentrating device generally designated $a$ consisting of a parabolic reflector bowl $b$ by which solar energy is reflected from its inner surface $c$ to a point at its parabolic focus $d$. A concave mirror $e$ is positioned at the parabolic focus $d$ by mirror supports $f$. Light energy, indicated by solid lines with arrowheads, enters the reflector bowl, is reflected to the parabolic focus $d$, and is further reflected by the concave mirror $e$ through a central aperture $g$ in the parabolic reflector bowl $b$. The parabolic reflector bowl $b$ is supported by two support arms $h$ extending downward from said reflector bowl $b$ and attached to parallel sides of a steam generator housing generally designated $i$ (FIG. 1) by pivot means $j$. The showing is schematic of conventional means to permit the reflector bowl $b$ and its support arms $h$ to pivot so as to follow the position of the sun.

The present invention also incorporates components of a conventional steam turbine generating system. Steam enters a steam turbine $m$ at the juncture of the steam outlet 20 and a conventional turbine inlet $k$, causing the turbine $m$ to rotate. The shaft $m$ of the turbine $m$ is concentric with the shaft $n$ of an electric generator $o$. Steam energy is thereby converted into electrical power. Steam exits via an exhaust port $p$ and enters a condenser $q$. Water collected in the condenser $q$ flows into a return pipe $r$ and is cycled back to a water reservoir chamber, hereafter described, by a conventional pump $s$.

The solar energy directed through the central aperture $g$ of the parabolic reflector bowl $b$, as heretofore described, passes between the parallel support arms $h$ and through a lens system contained within a lens housing 22, which conventionally provides means to solar energy directed through said aperture. In the preferred embodiment, a singly convex lens 23 (preferably of ruby glass to obtain maximum intensity of the red energy) is mounted upon a circular seating surface 24 within the radially inner wall 25 of the lens housing 22. Solar energy directed through the lens 23 passes downward through a bi-convex lens 26 supported upon a vertically movable lens mount, generally designated 60.

The lens housing 22 has an inward tapering lower portion 27 below said lens 26, tapering inward to an orifice 28 through which solar energy passes into a concentrating chamber 29 thereunder. The energy so focused impinges upon the head 31 of a conductor element generally designated 30, hereafter described, and centrally positioned beneath said orifice 28. The conductor head 31 is surrounded by a heat shield 32 having a top control opening 33, the shield 32 being based on the lower wall 34 of the concentrating chamber 29. The upper portion of the heat shield 32 curves inwardly, partly over the conductor element head 31, but its opening 33 is large enough to permit entrance of all the solar energy when focused upon the conductor 31. The radially inner surface of said heat shield 35 is coated with a reflector substance, to cause heat radiating from the heat conductor to be directed back onto it.

Figure 2:
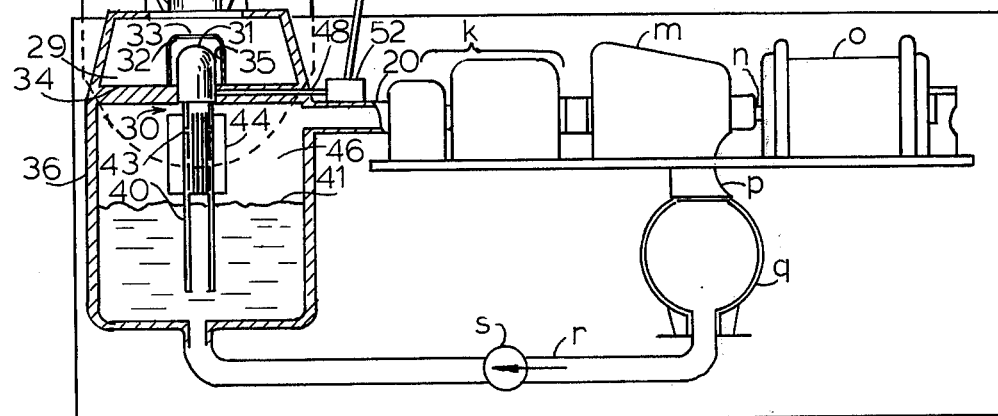
FIG. 2 is a vertical section, partly schematic, of the apparatus of FIG. 1.

The heat conductor element 30, shown in FIGS. 2 and 4, consists of a heat-receiving head portion 31 projecting upward from the lower wall 34 into the concentrating chamber 29, and a conductive portion, hereafter described, extending downward through the wall 34 into a water reservoir chamber 36 therebeneath. The heat-receiving head portion 31 is at the normal focus of the lens system described. In the preferred embodiment the heat receiving head portion 31 is the semi-spherical upper end 27 made of a high heat conductive, nonoxidizable metal.

Preferably integral with the head portion 31, and in any case so secured thereto as to form a heat-conductive extension therefrom, is a conductive portion 40. In the illustrated embodiment this portion 40 is made up of 4 rod-like elements projecting downward into the water reservoir chamber, through a head space 36 therein and below the water level 41.

Mounted on these rod-like conductive portions 40 are convection surface means 42 comprised of horizontal rings 43 and projecting vertical fins 44. FIG. 5 is an enlarged horizontal cross-sectional view positioned thereof. The rings 43 have parallel bores 45 fitted onto said portion 40 in the head space 46 above the water level 41. The vertical convectors 44 are conventionally appended to said rings 43 at angular intervals and extend radially outward.

A conventional thermosensor 48 monitors the heat generated in the heat-receiving head portion 31 of the conductor element 30. A suitable thermosensor, shown fragmentarily in FIG. 4, has a rod 49 and tube 50 of thermally dissimilar metals embedded in the heat-receiving head portion 31 of the conductor element 30. Heating the heat-receiving head portion 31 changes the length of the rod 49 relative to the tube 50. Such changes activate a conventional electrical or electronic means 52 to transmit a signal to a reversing electric motor 53. This changes the focus of the lens system as hereafter described.

The lens mount generally designated 60 as best seen in FIG. 3, consists of a lower externally threaded lens mounting 61 and an upper clamping ring 62 secured by pins 63. Formed on the upper ring 62 to project radially is a vertical key portion 64, which may slide freely in the keyway 65 of an integral projection 66 within the lens housing 22.

At the juncture of the tapering lower wall 27 of the housing 22 and the substantially cylindrical portion thereabove is a planar annular bearing surface 68 on which rests a rotatable internally threaded ring 70 whose threads engage and support the lens ring 61.

Above this juncture, the housing 22 has a slot 71 extending more than 180°. Secured in the radially outer side of the internally threaded ring 70 is a sector 73 of convenient angular length, having 45° beveled gear teeth 74. By these, the ring 70 may be rotated through a desired small angle to raise or lower the lens mount ring 61, which due to the resistance of the keyway 65 cannot rotate. Its consequent vertical movement changes the focus of the lens system as to control the amount of solar energy impinging on the conductor head 31. Rotation of the sector 73 is accomplished by the engagement of a 45° bevel gear 76 mounted on the shaft of the reversing motor 53, controlled by the thermosensor signal means 52.

The apparatus thus described provides a process in which solar energy produces superheated steam to drive a turbine. The reflector bowl b concentrates such solar energy, directing it into a lens system by a concave mirror e. Solar energy may thus be focused to create an extremely hot point upon the surface of the head of the conductor element 31. Temperatures at such a point of focus can reach several thousand degrees Fahrenheit. Heat is transferred through the heat-receiving conductor head 31 downwardly into a conductive portion 40 within a water reservoir chamber 36. The lower portion of said conductive portion 40 is submerged below the water level 41 in the water reservoir chamber 36. The water serves as a heat sink. Heat conducted downward from the conductor head 31 is transferred by the lower conductive portion 40 directly into the water, causing steam formation. This steam rises into the head space 46 at the top of the water reservoir chamber 36 bathing the surfaces of the convection fins 44. Since these fins are mounted into the upper portions of the rod elements 40, whose temperature is much greater than their lower end portions within the water, the intense heat of the convector fins 44 superheats the steam in the head space 46 to a temperature suitable for driving the turbine m. Since the superheating is carried on within the water reservoir chamber, the apparatus and the process are greatly simplified over the prior art.

From this disclosure, variations in detail will be apparent to those skilled in the art.

I claim:

1. For use in a steam generating system having a conventional steam turbine, apparatus to generate steam from solar energy, comprising reflector means to concentrate said solar energy and lens means to focus such solar energy substantially at a focal point, a conductor element having a heat-receiving head portion positioned substantially at said focal point, whereby such energy impinges thereon, and having a conductive portion depending therefrom, a water reservoir chamber having a normal water level and a head space thereabove including a steam outlet communicating with such turbine, said conductor element being mounted in a top wall of said reservoir chamber with its head portion projecting thereabove and its heat conducting portion extending downward into the lower part of said reservoir chamber, whereby its lower end projects below such water level, thereby to conduct heat to such water, said conductive portion having finned convection surface means above such water level, whereby to superheat the steam rising in the headspace of said reservoir chamber.

2. Apparatus to generate steam from solar energy as defined in claim 1, further having
control means to vary the quantum of light impinging upon said conductor element,
whereby the temperature in the reservoir chamber may be regulated for optimum heating.

3. Means to generate steam from solar energy as defined in claim 2, wherein said control means comprises
means to sense the intensity of the energy impinging on said head portion, and
means operably responsive to said sensor means to control the focus of lens,
whereby the temperature and pressure in the reservoir chamber are regulated.

4. Apparatus to generate steam from solar energy as defined in claim 1, wherein the reflector means comprises
a parabolic bowl having a central light passage, and a concave mirror at the focus of the parabolic bowl directed at said light passage,
whereby light from the bowl is reflected to said lens system.

5. The process of converting solar energy into superheated steam, comprising the steps of
directing such solar energy gathered by a reflector through a lens system to converge on the head of a conductive element mounted in the upper wall of a reservoir chamber with a head portion projecting therethrough and a heat conducting portion extending downward through a head space into water in the lower part of such reservoir chamber,
heating such head portion to a temperature substantially above the boiling point of water,
conducting the heat downward from the head portion through the conductive portion in part to projecting convection surface means mounted thereon in the head space and in part downward into the water,
from said water generating steam which rises in the head space, and
superheating the steam so rising by transferring heat thereto from the projecting convection surface means.

6. The process of converting solar energy into superheated steam as defined in claim 5, together with the steps of
monitoring the intensity of the energy so converging on said head portion by means of a sensor, and
modulating the focus of the lens in response to the intensity so sensed,
whereby to avoid overheating while maintaining production of steam at optimum level.

* * * * *